United States Patent [19]
Maioli

[11] Patent Number: 4,909,293
[45] Date of Patent: Mar. 20, 1990

[54] TOOL ASSEMBLY FOR WOODWORKING MACHINES

[75] Inventor: Fabio Maioli, Sant'Arcangelo, Italy

[73] Assignee: SCM Industria S.p.A., Rimini, Italy

[21] Appl. No.: 352,398

[22] Filed: May 15, 1989

[30] Foreign Application Priority Data

May 24, 1988 [IT] Italy .................. 3475 A/88

[51] Int. Cl.⁴ .................. B27G 1/00; B23C 5/02
[52] U.S. Cl. .................. 144/252 R; 83/100; 144/134 A; 144/137; 409/137; 408/67
[58] Field of Search .......... 83/100; 408/67, 68, 408/125, 129, 137; 409/85, 137, 185; 144/241 R, 251 A, 252 R, 252 A, 134 A, 137

[56] References Cited

U.S. PATENT DOCUMENTS

| | | | |
|---|---|---|---|
| 3,710,833 | 1/1973 | Hammer et al. | 144/134 A |
| 3,837,383 | 9/1974 | Ko | 144/252 R |
| 3,838,722 | 10/1974 | Downing | 144/134 A |
| 3,880,047 | 4/1975 | Dosier | 144/252 R |
| 4,200,417 | 4/1980 | Hager et al. | 144/251 A |
| 4,397,342 | 8/1983 | North | 144/252 R |
| 4,742,855 | 5/1988 | Hartley | 409/137 |
| 4,822,219 | 4/1989 | Wood et al. | 144/252 R |

Primary Examiner—W. Donald Bray
Attorney, Agent, or Firm—Darby & Darby

[57] ABSTRACT

The tool assembly is intended for woodworking machines having an integral spindle drive with electric motor and rotary tool holder combined in a one-piece unit; use is made of a tubular sleeve to accommodate the spindle drive, which is mounted coaxially at one end with the tool and holder projecting, and supported by a set of radial webs alternated with a similar number of openings and bridging a gap created between the motor and the sleeve, given that the transverse dimensions of the spindle unit are less than the bore of the sleeve. The sleeve connects at the top end with the duct of an extractor system and is carried slidably in relative supports, capable of controlled traversing movement along its own longitudinal axis.

4 Claims, 1 Drawing Sheet

TOOL ASSEMBLY FOR WOODWORKING MACHINES

BACKGROUND of the INVENTION

The present invention relates to a tool assembly for woodworking machines.

In woodworking, and more especially, when shaping or drilling boards or laths destined as parts for mass produced items and supplied to industry, or to the furnishing trade (e.g. ornaments, furniture components etc.), use is made of power machines provided with a vertically disposed tool that is capable of movement along its own axis (the depth axis 'z'), whereas movement in the horizontal plane (axes 'x' and 'y'), is generally accomplished by positioning the work table.

Such machines are fitted with integral electric motor and spindle assemblies carrying quick change tools, the entire assembly being slidably mounted on dovetailed ways, cantilevered from one side, and traversed in most instances by a relative motor, generally hydraulic; arrangement of the type in question is disclosed in GB No. 2117510. Given the dual necessity that exists for cooling of the spindle motor and removal of the waste machined from the work, the one-piece assembly is encompassed by a coaxially disposed casing, part-open at the bottom and appearing as a circular cowl surrounding the tool; the top end of the casing is connected to the duct of an extractor system.

Such an arrangement is particularly cumbersome, and tends to produce inaccurate machining; inaccuracies can in fact be remedied by augmenting the general proportions of the structure, though this clearly involves higher costs.

Accordingly, the object of the present invention is to provide a tool assembly, comprising a spindle and electric motor, structured in such a way that the machine into which it is incorporated can be made notably compact, hence of reduced transverse dimensions, capable of accurate machining, and particularly advantageous in terms of cost per unit of performance and rated power.

SUMMARY of the INVENTION

The stated object is realized with a tool assembly as disclosed herein. Such an assembly comprises a sleeve of which one end accommodates the spindle motor, mounted coaxially by way of a set of radial webs alternating with a similar number of radial openings, and the remaining end is connected to a duct associated with extractor means; according to the invention, the transverse dimensions of the spindle motor are less than the bore of the sleeve, such that a gap is created between the two, and the sleeve itself is carried by relative supports and capable of a controlled traverse movement along its own longitudinal axis.

BRIEF DESCRIPTION of the DRAWINGS

The invention will now be described in detail, by way of example, with the aid of the accompanying drawings, in which.

DESCRIPTION of the PREFERRED EMBODIMENTS

Figure 2:
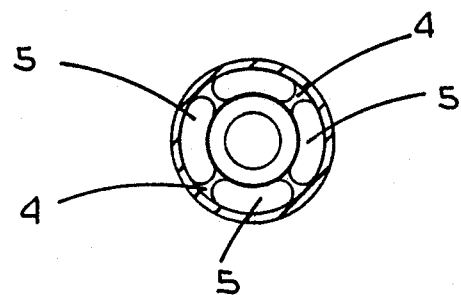
FIG. 2 is the section through II—II in FIG. 1.

The tool assembly according to the assembly forms a part of woodworking machinery, and is of the type comprising a one-piece spindle drive 1 consisting in an electric motor and a rotary tool holder 2. According to the invention, the tool assembly comprises an outer sleeve 3 of tubular embodiment, one end of which carries the spindle motor 1. The motor is mounted coaxially to the sleeve 3 at one end, with the rotary tool holder 2 projecting, supported thus by a plurality of radial webs 4 that alternate and combine with a matching number of openings 5 in such a way as to create an annular formation bridging the gap between the motor and the sleeve 3 (FIG. 2).

The transverse dimensions of the motor 1 are less than the internal dimensions of the sleeve 3, such that a space remains between the two components. The end of the sleeve 3 farthest from the tool is connected to a duct 15, which in turn is connected with extractor means not shown in the drawings. The sleeve 3 is carried by a set of supports 6, and capable of sliding in relation thereto along its own longitudinal axis; in the example of FIG. 1, the sleeve is vertically disposed, and the supports 6 consist in two horizontal arms extending from an upright pillar 13 that forms part of the machine structure.

11 denotes a flange rigidly associated with and encircling the sleeve 3, with which means 7 are associated that produce the controlled movement of the sleeve 3 along its longitudinal axis.

Figure 1:
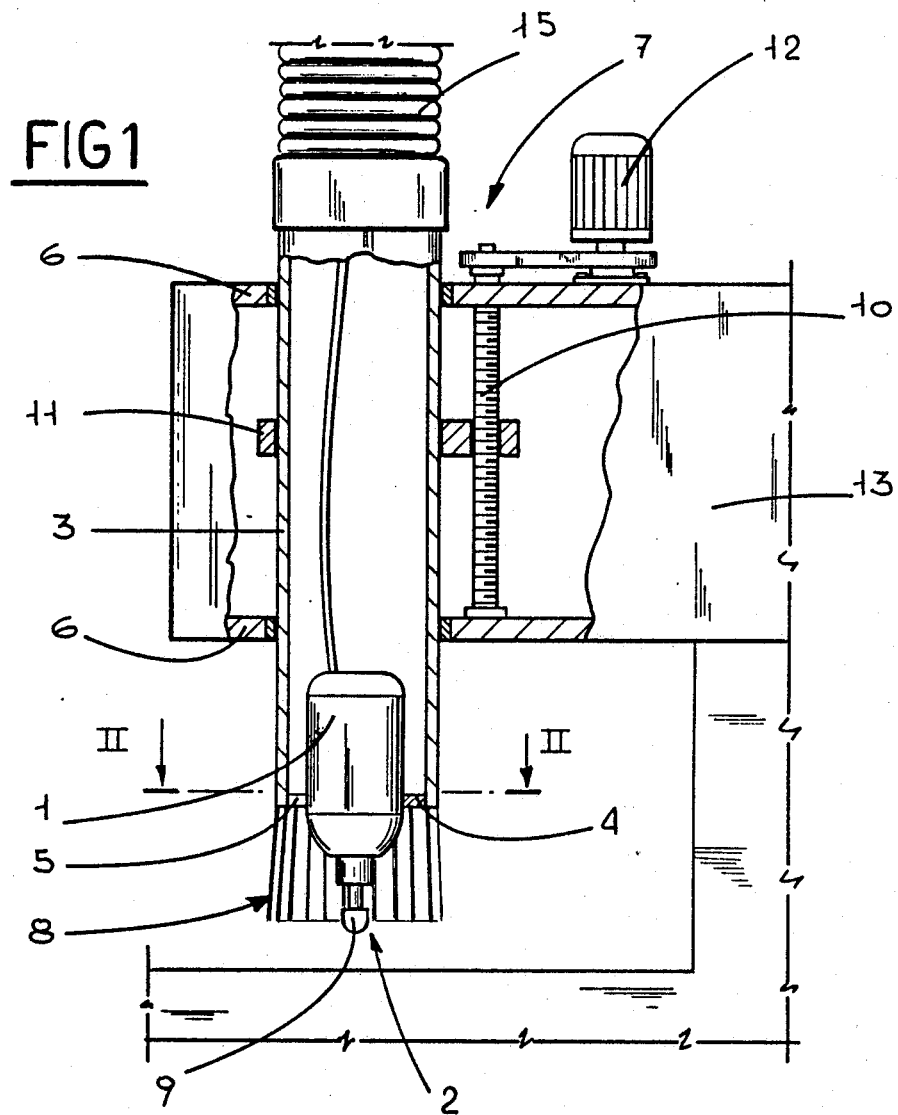
FIG. 1 is schematic representation of the tool assembly disclosed, viewed in an axial section that illustrates its essential parts.

Such means 7 consist in a rod 10, parallel with the sleeve 3 and embodied in FIG. 1 as a lead screw passing through a matching thread afforded by the flange 11 and anchored at either end to the arms 6 by which the sleeve is supported. The screw 10 is rotated in either direction by a reversible motor 12 mounted permanently to the top arm 6. The motor 12 or the screw 10 will be associated with means by which to control the rotation of the screw, hence the position of the flange 11, hence the position of the sleeve 3 in relation to the arms 6. 8 denotes a detachable cowl associated with the bottom end of the sleeve 3 and encircling the tool holder 2, which extends from the end of the sleeve down to a point on a level with the tool 9 fitted to the holder 2.

The cowl 8 serves to ensure adequate suction around the actual tool 9.

In an alternative embodiment of the means 7 for producing and controlling movement of the sleeve, the rod 10 might be that of a double acting fluid power cylinder.

What is claimed is:

1. A tool assembly for woodworking machines, comprising:

an integral spindle drive, with electric motor and rotary tool holder combined in a one-piece unit;

a tubular guide sleeve having first and second ends, said tubular guide sleeve of internal transverse dimensions greater than the overall transverse dimensions of the spindle drive, of which said first end is connected to a duct associated with extractor means, and said second end accommodates the spindle drive, coaxially disposed with the tool holder projecting and supported by way of a plurality of radial webs alternated and combining with a similar plurality of openings to create an annular bridge across the gap existing between the sleeve and the spindle drive as a result of their dissimilar transverse dimensions;

a set of supports, in which the sleeve is carried slidably and capable of controlled movement along its own longitudinal axis;

means, associated with the sleeve and serving to generate its controlled movement.

2. An assembly as in claim 1, further comprising a detachable cowl fitted to the sleeve at the end occupied by the tool holder, which extends from the end of the sleeve to the point of encircling a tool fitted to the holder and serves to encompass a space such as will ensure a degree of suction around the tool sufficient for extraction purposes.

3. An assembly as in claim 1, wherein means by which to generate controlled axial movement of the sleeve consist in a rod disposed parallel with the sleeve and associated with a flange encircling and rigidly associated with the sleeve.

4. An assembly as in claim 3, wherein the rod is embodied as a lead screw threadedly associated with the flange and driven in one direction and the other by a reversible motor.

* * * * *